March 18, 1947.  L. J. HIBBARD  2,417,754
CONTROL SYSTEM
Filed Sept. 7, 1944  2 Sheets-Sheet 1

WITNESSES:
E.A. McCloskey

INVENTOR
Lloyd J. Hibbard.
BY
ATTORNEY

March 18, 1947.     L. J. HIBBARD     2,417,754

CONTROL SYSTEM

Filed Sept. 7, 1944     2 Sheets-Sheet 2

Fig. 4A.

| Notch | Sequence of Switches |  |  |  |  |  |  |  |  |  |  |  |
|---|---|---|---|---|---|---|---|---|---|---|---|---|
|  | 1 | 2 | 3 | 4 | 5 | 6 | 7 | 8 | 9 | 10 | 11 | 12 |
| 1 | O |  |  |  |  |  |  |  |  |  |  | O |
| 2 | O | O |  |  |  |  |  |  |  |  |  |  |
| 3 |  | O |  |  |  |  |  |  |  |  |  | O |
| 4 |  | O | O |  |  |  |  |  |  |  |  |  |
| 5 |  |  | O |  |  |  |  |  |  |  |  | O |
| 6 |  |  | O | O |  |  |  |  |  |  |  |  |
| 7 |  |  |  | O |  |  |  |  |  |  |  | O |
| 8 |  |  |  | O | O |  |  |  |  |  |  |  |
| 9 |  |  |  |  | O |  |  |  |  |  |  | O |
| 10 |  |  |  |  | O | O |  |  |  |  |  |  |
| 11 |  |  |  |  |  | O |  |  |  |  |  | O |
| 12 |  |  |  |  |  | O | O |  |  |  |  |  |
| 13 |  |  |  |  |  |  | O |  |  |  |  | O |
| 14 |  |  |  |  |  |  | O | O |  |  |  |  |
| 15 |  |  |  |  |  |  |  | O |  |  |  | O |
| 16 |  |  |  |  |  |  |  | O | O |  |  |  |
| 17 |  |  |  |  |  |  |  |  | O |  |  | O |
| 18 |  |  |  |  |  |  |  |  | O | O |  |  |
| 19 |  |  |  |  |  |  |  |  |  | O |  | O |
| 20 |  |  |  |  |  |  |  |  |  | O | O |  |
| 21 |  |  |  |  |  |  |  |  |  |  | O | O |

Fig. 4B.

Inter-notch Switch Sequence.

| 19 |  | 20 |  | Notching | Volts added to |
|---|---|---|---|---|---|
| a | b | a | b | Transf. Volts | Main Notch Volts |
| O |  | O |  | 16 Buck | None |
| O |  |  | O | None | 16 |
|  | O |  | O | 16 Boost | 32 |

Fig. 5.

| Notch | Sequence of Switches |  |  |  |  |  |  |  |  |  |  |  |  |  |  |  |
|---|---|---|---|---|---|---|---|---|---|---|---|---|---|---|---|---|
|  | 1 | 2 | 3 | 4 | 5 | 6 | 7 | 8 | 9 | 10 | 11 | 12 | 13 | 14 | 15 | 16 |
| 1 |  |  |  |  |  |  |  |  |  |  | O | O | O | O |  |  |
| 2 |  |  |  |  |  |  |  |  |  |  | O | O |  | O | O |  |
| 3 |  |  |  |  |  |  |  |  |  | O |  | O | O | O |  |  |
| 4 |  |  |  |  |  |  |  |  | O | O |  |  | O | O |  |  |
| 5 |  |  |  |  |  |  |  |  | O |  |  | O | O | O |  |  |
| 6 |  |  |  |  |  |  |  | O | O |  |  |  | O | O |  |  |
| 7 |  |  |  |  |  |  |  | O |  |  |  | O | O | O |  |  |
| 8 |  |  |  |  |  |  | O | O |  |  |  |  | O | O |  |  |
| 9 |  |  |  |  |  |  | O |  |  |  |  | O | O | O |  |  |
| 10 |  |  |  |  |  | O | O |  |  |  |  |  | O | O |  |  |
| 11 |  |  |  |  |  | O |  |  |  |  |  | O | O | O |  |  |
| 12 |  |  |  |  | O | O |  |  |  |  |  |  | O | O |  |  |
| 13 |  |  |  |  | O |  |  |  |  |  |  | O | O | O |  |  |
| 14 |  |  |  | O | O |  |  |  |  |  |  |  | O | O |  |  |
| 15 |  |  |  | O |  |  |  |  |  |  |  | O | O | O |  |  |
| 16 |  |  | O | O |  |  |  |  |  |  |  |  | O | O |  |  |
| 17 |  |  | O |  |  |  |  |  |  |  |  | O | O | O |  |  |
| 18 |  | O | O |  |  |  |  |  |  |  |  |  | O | O |  |  |
| 19 |  | O |  |  |  |  |  |  |  |  |  | O | O | O |  |  |
| 20 | O | O |  |  |  |  |  |  |  |  |  |  | O | O |  |  |
| 21 | O |  |  |  |  |  |  |  |  |  |  | O | O | O |  |  |
| 21A | O |  |  |  |  |  |  |  |  |  |  | O | O | O | O | O |
| 21B | O |  |  |  |  |  |  |  |  |  |  | O |  |  | O | O |
| 22 | O | O |  |  |  |  |  |  |  |  |  |  |  |  | O | O |
| 23 |  | O |  |  |  |  |  |  |  |  |  | O |  |  | O | O |
| 24 |  | O | O |  |  |  |  |  |  |  |  |  |  |  | O | O |
| 25 |  |  | O |  |  |  |  |  |  |  |  | O |  |  | O | O |
| 26 |  |  | O | O |  |  |  |  |  |  |  |  |  |  | O | O |
| 27 |  |  |  | O |  |  |  |  |  |  |  | O |  |  | O | O |
| 28 |  |  |  | O | O |  |  |  |  |  |  |  |  |  | O | O |
| 29 |  |  |  |  | O |  |  |  |  |  |  | O |  |  | O | O |
| 30 |  |  |  |  | O | O |  |  |  |  |  |  |  |  | O | O |
| 31 |  |  |  |  |  | O |  |  |  |  |  | O |  |  | O | O |
| 32 |  |  |  |  |  | O | O |  |  |  |  |  |  |  | O | O |
| 33 |  |  |  |  |  |  | O |  |  |  |  | O |  |  | O | O |
| 34 |  |  |  |  |  |  | O | O |  |  |  |  |  |  | O | O |
| 35 |  |  |  |  |  |  |  | O |  |  |  | O |  |  | O | O |
| 36 |  |  |  |  |  |  |  | O | O |  |  |  |  |  | O | O |
| 37 |  |  |  |  |  |  |  |  | O |  |  | O |  |  | O | O |
| 38 |  |  |  |  |  |  |  |  | O | O |  |  |  |  | O | O |
| 39 |  |  |  |  |  |  |  |  |  | O |  | O |  |  | O | O |
| 40 |  |  |  |  |  |  |  |  |  | O | O |  |  |  | O | O |
| 41 |  |  |  |  |  |  |  |  |  |  | O | O |  |  | O | O |

WITNESSES:
E.G. McCloskey
T.F. Chillcot

INVENTOR
Lloyd J. Hibbard.
BY E.M. Crawford
ATTORNEY

Patented Mar. 18, 1947

2,417,754

UNITED STATES PATENT OFFICE 2,417,754

CONTROL SYSTEM

Lloyd J. Hibbard, Wilkinsburg, Pa., assignor to Westinghouse Electric Corporation, East Pittsburgh, Pa., a corporation of Pennsylvania Application September 7, 1944, Serial No. 553,025

7 Claims. (Cl. 171—242)

My invention relates, generally, to control systems and, more particularly, to systems for controlling the operation of electrically propelled vehicles, such as electric locomotives.

In my copending application, Serial No. 551,129, filed August 25, 1944, now Patent No. 2,387,262, issued October 23, 1945, several high-tension notching schemes are described in which the tapchanging switches are connected to the high voltage winding of a power transformer in a locomotive.

An object of the present invention is to provide additional high-tension notching schemes of the aforesaid type.

Another object of the invention is to reduce the number of transformer windings required for performing the tap-changing operations during the acceleration of a locomotive.

A more general object of the invention is to provide a locomotive control system which shall be simple and efficient in operation and which may be economically manufactured and installed.

Other objects of the invention will be explained fully hereinafter or will be apparent to those skilled in the art.

In accordance with my invention, a regulating transformer is provided with a plurality of high-tension taps which are connected to a buck-boost transformer by tap-changing switches operable in sequential relation. During the accelerating period, the variable voltage of the buck-boost transformer is first subtracted from and then added to a fixed voltage which is applied to the traction motors, thereby gradually increasing the motor voltage.

For a fuller understanding of the nature and objects of my invention, reference may be had to the following detailed description, taken in conjunction with the accompanying drawings, in which:

Figs. 4A and 4B are charts showing the sequence of operation of certain of the switches illustrated in Fig. 1, and Fig. 5 is sequence chart for Figs. 2 and 3.

Figure 1:
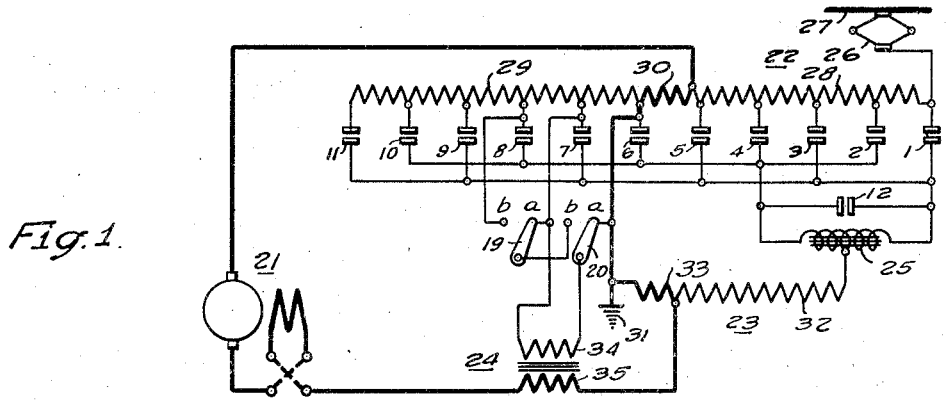
Figure 1 is a schematic diagram of a control system embodying the principal features of my invention.

Referring to the drawings and particularly to Fig. 1, the system shown therein comprises a motor 21 which may be of a type suitable for propelling an electric locomotive (not shown); a regulating auto-transformer 22; a main buck-boost transformer 23; an auxiliary buck-boost transformer 24; a plurality of tap-changing switches 1 to 11, inclusive, for connecting the buck-boost transformer 23 to taps on the winding of the regulating transformer 22; a preventive coil 25 which functions in the usual manner to prevent short circuiting portions of the transformer winding during the tap-changing operation; a switch 12 which is closed periodically during the switching operations to balance the voltage across the preventive coil 25, and a pair of switches 19 and 20 for changing the connections of the auxiliary buck-boost transformer during the accelerating period, as will be explained more fully hereinafter. The regulating transformer 22 may be connected by means of a pantagraph collector 26 to an overhead trolley conductor 27 which may be energized from any suitable source of power (not shown).

As shown, the winding of the regulating autotransformer 22 is divided into two high-tension portions 28 and 29 and a low-tension portion 30. The mid-point of the transformer winding is connected to ground at 31. The winding of the main buck-boost transformer 23 is divided into a high-tension portion 32 and a low-tension portion 33. The one terminal of the transformer is connected to ground at 31 and also to the mid-point of the winding of the transformer 22.

The auxiliary buck-boost transformer 24 is provided with a primary winding 34 and a secondary winding 35. The polarity of the auxiliary buck-boost transformer 24 may be changed by operating the switches 19 and 20 to connect the primary winding 34 to different taps on the transformer 22, thereby causing the voltage of the secondary winding 35 to be subtracted from or added to the motor voltage.

Likewise, the polarity of the main buck-boost transformer 23 is reversed during the tap-changing operation, as will be explained more fully hereinafter, thereby causing the voltage of the low-tension portion 33 of this transformer to be subtracted from or added to the voltage of the low-tension portion 30 of the transformer 22. Since the voltage of the winding 33 may be varied by closing the tap-changing switches 1 to 11 in a predetermined sequence, the voltage applied to the motor 21, which is the resultant of the variable voltage from the transformer 23 and the fixed voltage from the transformer 22, may be gradually increased to accelerate the motor.

In order that the functioning of the foregoing apparatus may be more clearly understood, the operation of the system will now be described in more detail. Assuming that the switches 19 and 20 are in position "a," as shown, the tap-changing switch 1 and the switch 12 may be closed to apply minimum voltage to the motor 21. Thus, maximum excitation is applied to the main buck-boost transformer 23 and it is so connected in the power circuit that the voltage of its winding 33 is subtracted from the voltage of the winding 30 of the regulating transformer 22.

Likewise, the auxiliary buck-boost transformer 24 is so connected that the voltage of its secondary winding 35 is subtracted from the voltage applied to the motor by the transformers 22 and 23. The excitation of the transformer 23 may be gradually reduced by closing the tap-changing switches 1 to 6 in the manner indicated in the sequence chart shown in Fig. 4A, thereby increasing the motor voltage. When the switch 6 is closed, both terminals of the transformer 23 are connected to the same tap on the transformer 22, thereby resulting in zero voltage from the transformer 23.

When the tap-changing switch 7 is closed, the polarity of the transformer 23 is reversed, thereby causing the voltage of the winding 33 to be added to the voltage of the winding 30 of the transformer 22. The excitation of the transformer 23 may be gradually increased by closing the switches 8 to 11 in the manner indicated in the sequence chart. When the switch 11 is closed, the maximum excitation is applied to the transformer 23 and the full voltage of the winding 33 is added to the voltage of the winding 30 of the transformer 22.

As indicated in the sequence chart shown in Fig. 4B, the auxiliary buck-boost transformer 24 may be utilized as an internotching transformer, thereby causing a change in the voltage applied to the motor 21 between each of the notches or steps obtained by the operation of the tap-changing switches 1 to 11. Assuming that the voltage of the secondary winding 35 is 16 volts, the voltage applied to the motor by the transformers 22 and 23 is reduced by this amount when the switches 19 and 20 are in position "a," as shown.

When the switch 20 is actuated to position "b," both terminals of the transformer winding 34 are connected to the same tap on the transformer 22, thereby resulting in zero voltage across the secondary winding 35. This results in an increase of the motor voltage by 16 volts, as indicated in the sequence chart. When the switch 19 is actuated to position "b," thereby reversing the polarity of the transformer 24, the voltage of the winding 35 is added to the voltage obtained from the transformers 22 and 23, thereby increasing the motor voltage by 32 volts.

Thus, by operating the switches 19 and 20 between each operation of the main tap-changing switches, the motor voltages may be changed between each of the main notches by a relatively small amount as compared to the change in voltage caused by the operation of the main tap-changing switches. In this manner, the internotching transformer 24 may be utilized to prevent slipping of the driving wheels of the locomotive by providing a more gradual increase in the voltage applied to the motor 21.

Figure 2:
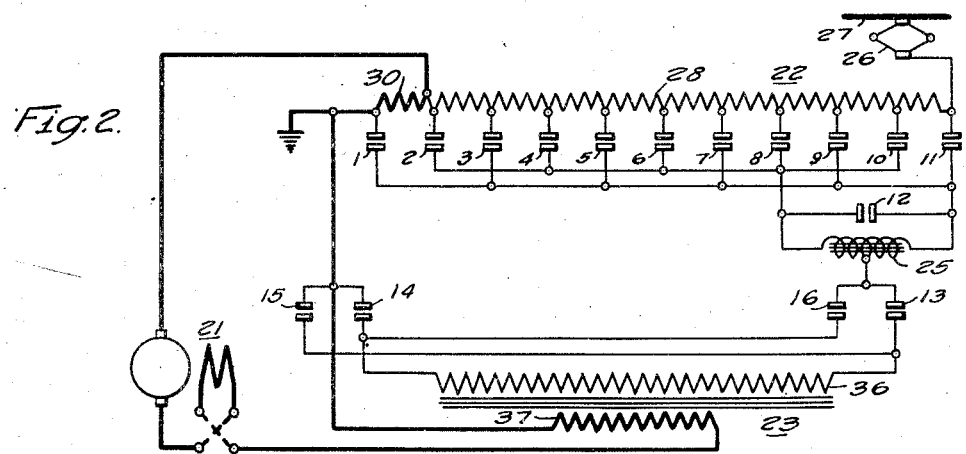
Fig. 2 is a schematic diagram of a modification of the invention.

In the modification of the invention shown in Fig. 2, in which like parts are designated by the same reference characters as in Fig. 1, the regulating transformer 22 is an auto-transformer similar to the one shown in Fig. 1 with the exception that its winding is divided into only one high-tension portion 28 and a low-tension portion 30. The main buck-boost transformer 23 has two windings, a primary winding 36 and a secondary winding 37. The polarity of the transformer 23 may be reversed by changing the connections for the primary winding 36 by operating reversing switches 13, 14, 15 and 16 in the manner shown in the sequence chart in Fig. 5.

The excitation of the transformer 23 may be varied by operating the main tap-changing switches 1 to 11 in the order shown in the sequence chart, thereby varying the voltage of the secondary winding 37. The variable voltage of this winding is first subtracted from and then added to the voltage of the winding 30 of the regulating transformer 22 in a manner similar to that previously explained in the description of the operation of the system shown in Fig. 1. Thus, minimum voltage is applied to the motor when the main tap-changing switch 11, the switch 12 and the reversing switches 13 and 14 are closed.

The excitation of the transformer 23 is gradually reduced by closing the switches 10 to 1 in the manner indicated in the sequence chart. Following the closing of the switch 1, the reversing switches 15 and 16 are closed and the switches 13 and 14 are opened, thereby reversing the polarity of the transformer 23 and causing the voltage of its secondary winding 37 to be added to the voltage of the winding 30 of the transformers 22.

The excitation of the transformer 23 is then increased from zero to maximum by closing the switches 2 to 11 in the manner indicated in the sequence chart. When the switch 11 is closed, maximum excitation is applied to the transformer 23 and maximum voltage is applied to the motor 21.

Figure 3:
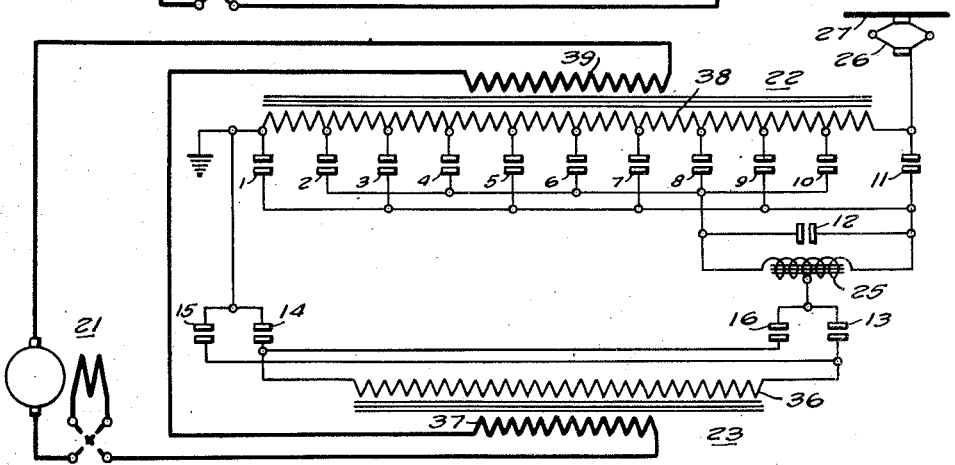
Fig. 3 is a schematic diagram of another modification of the invention.

In the modification of the invention shown in Fig. 3, the regulating transformer 22 has two windings, a primary winding 38 and a secondary winding 39. Otherwise, the apparatus is similar to that shown in Figs. 1 and 2. As explained hereinbefore, the voltage of the secondary winding 37 of the transformer 23 is first subtracted from and then added to the voltage of the secondary winding 39 of the transformer 22.

The voltage of the winding 37 may be varied by operating the tap-changing switches 1 to 11 in the manner shown in the sequence chart in Fig. 5, thereby gradually increasing the voltage applied to the motor 21. The polarity of the transformer 23 is reversed at substantially the midpoint of the accelerating period, thereby changing the transformer 23 from a bucking to a boosting transformer in a manner similar to that hereinbefore described.

The internotching transformer 24 has been omitted from Figs. 2 and 3. However, it will be understood that an internotching transformer may be utilized in conjunction with the apparatus shown in these figures in the manner hereinbefore described, if desired.

From the foregoing description, it is apparent that I have provided a high-tension notching system for controlling the voltage applied to an alternating-current motor during its accelerating period which requires a relatively small amount of apparatus and is, therefore, more compact, lighter and cheaper than systems previously known. The system herein described is particularly suitable for controlling the operation of the propelling motors of electric locomotives but is not necessarily limited to such uses.

Since numerous changes may be made in the above described construction and different embodiments of the invention may be made without departing from the spirit and scope thereof, it is intended that all matter contained in the foregoing description or shown in the accompanying drawing, shall be interpreted as illustrative and not in a limiting sense.

I claim as my invention:

1. In a control system, in combination, a regulating transformer having a high-tension portion and a low-tension portion, a plurality of taps on the high-tension portion, a buck-boost transformer, a plurality of tap-changing switches for connecting the buck-boost transformer to said high-tension taps in a predetermined sequence to vary its voltage, and means for reversing the polarity of the buck-boost transformer to cause its variable voltage to be first subtracted from and then added to the fixed voltage of the low-tension portion of the regulating transformer.

2. In a control system, in combination, a regulating transformer having a high-tension portion and a low-tension portion, a plurality of taps on the high-tension portion, a buck-boost transformer, a plurality of tap-changing switches for connecting the buck-boost transformer to said high-tension taps in a predetermined sequence to vary its voltage, and means for changing the connections of the buck-boost transformer to the regulating transformer to cause the voltage of the buck-boost transformer to be first subtracted from and then added to the fixed voltage of the low-tension portion of the regulating transformer.

3. In a control system, in combination, a regulating transformer having a high-tension portion and a low-tension portion, a plurality of taps on the high-tension portion, a buck-boost transformer, a plurality of tap-changing switches for connecting the buck-boost transformer to said high-tension taps in a predetermined sequence to vary its voltage, and switching means for reversing the polarity of the buck-boost transformer to cause its voltage to be first in differential and then in cumulative relation with the fixed voltage of the low-tension portion of the regulating transformer.

4. In a control system, in combination, a regulating auto-transformer having a high tension portion and a low tension portion, a plurality of taps to its high tension portion, a main buck-boost transformer having one terminal connected to the mid-point of the auto-transformer, and a plurality of tap-changing switches for connecting the buck-boost transformer to the taps on the regulating transformer in a predetermined sequence to vary the voltage of the buck-boost transformer, the polarity of the buck-boost transformer being reversible to cause its variable voltage to be first subtracted from and then added to a fixed voltage obtained from the low tension portion of the regulating transformer.

5. In a control system, in combination, a regulating auto-transformer having a high tension portion and a low tension portion, a plurality of taps to its high tension portion, a main buck-boost transformer having one terminal connected to the mid-point of the auto-transformer, a plurality of tap-changing switches for connecting the buck-boost transformer to the taps on the regulating transformer in a predetermined sequence to vary the voltage of the buck-boost transformer, the polarity of the buck-boost transformer being reversible to cause its variable voltage to be first subtracted from and then added to a fixed voltage obtained from the low tension portion of the regulating transformer, an auxiliary buck-boost transformer, and switching means for reversing the polarity of the said auxiliary buck-boost transformer.

6. In a control system, in combination, a regulating auto-transformer having a high tension portion and a low tension portion, a plurality of taps to its high tension portion, a buck-boost transformer having a primary winding and a secondary winding, a plurality of tap-changing switches for connecting the primary winding to the taps on the regulating transformer in a predetermined sequence to vary the voltage of the secondary winding, and switching means for reversing the polarity of the buck-boost transformer to cause the variable voltage of the secondary winding to be first subtracted from and then added to a fixed voltage obtained from the low tension portion of the regulating transformer.

7. In a control system, in combination, a regulating transformer having a primary winding and a secondary winding, a plurality of taps on the primary winding, a buck-boost transformer having a primary winding and a secondary winding, a plurality of tap-changing switches for connecting the primary winding of the buck-boost transformer to the taps on the regulating transformer in a predetermined sequence to vary the voltage of the secondary winding, and switching means for reversing the polarity of the buck-boost transformer to cause the voltage of its secondary winding to be first in differential and then in cumulative relation with the fixed voltage of the secondary winding of the regulating transformer.

LLOYD J. HIBBARD.

REFERENCES CITED

The following references are of record in the file of this patent:

UNITED STATES PATENTS

| Number | Name | Date |
| --- | --- | --- |
| 2,227,498 | Hibbard | Jan. 7, 1941 |
| 2,200,084 | Hibbard | May 7, 1940 |
| 1,905,249 | Snyder | Apr. 25, 1933 |